(No Model.)

G. W. HUNT.
WHEEL PLOW.

No. 285,412. Patented Sept. 25, 1883.

WITNESSES:
Chas. Nida
C. Sedgwick

INVENTOR:
G. W. Hunt
BY
ATTORNEYS.

UNITED STATES PATENT OFFICE.

GEORGE W. HUNT, OF MUSCATINE, IOWA.

WHEEL-PLOW.

SPECIFICATION forming part of Letters Patent No. 285,412, dated September 25, 1883.

Application filed December 14, 1882. (No model.)

*To all whom it may concern:*

Be it known that I, GEORGE W. HUNT, of Muscatine, in the county of Muscatine and State of Iowa, have invented certain new and useful Improvements in Wheel-Plows, of which the following is a full, clear, and exact description.

Reference is to be had to the accompanying drawings, forming part of this specification, in which similar letters of reference indicate corresponding parts in both the figures.

Figure 1:
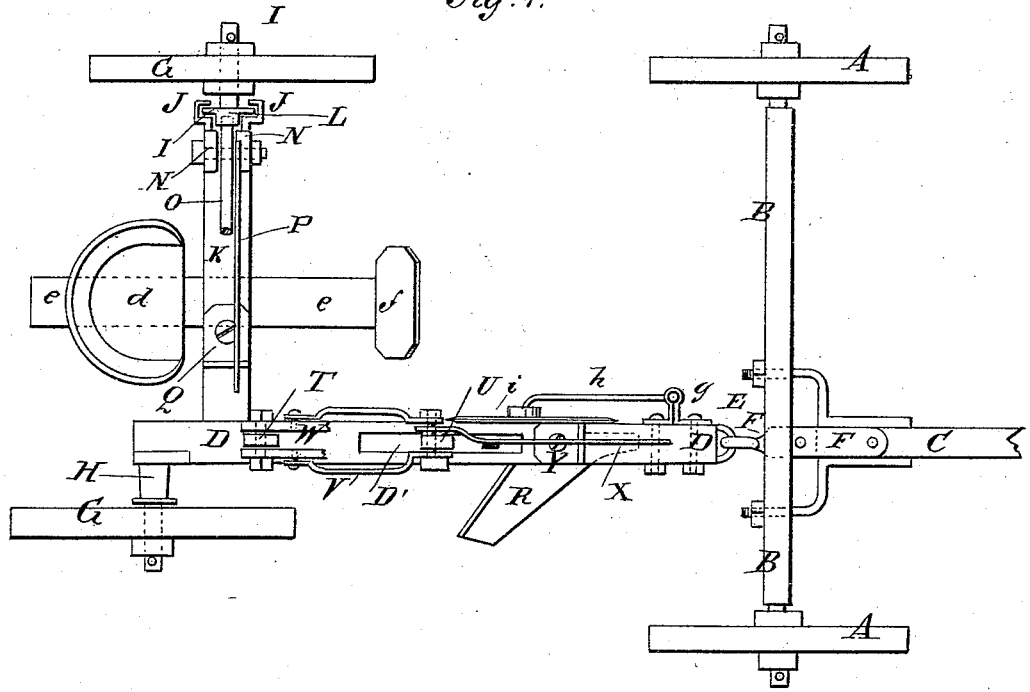
Figure 2:
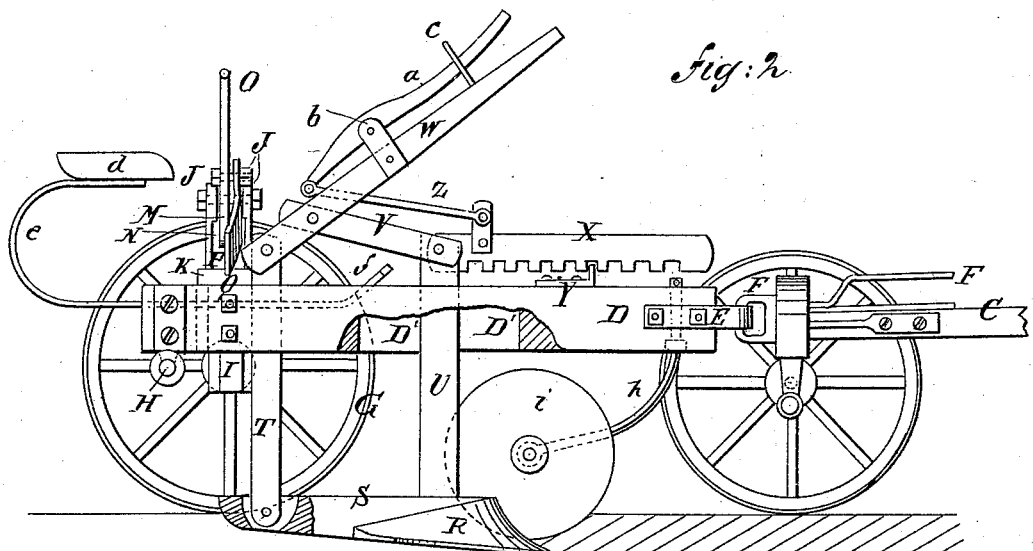

Figure 1 is a plan view of my improved plow shown as applied to a four-wheeled carriage. Fig. 2 is a side elevation of the same, the off wheels being removed and part of the plow-beam being broken away.

The object of this invention is to promote convenience in adjusting the pitch of plows to cause them to enter and leave the ground readily.

The invention consists in the plow-beam having longitudinal slot, in combination with a standard attached to the forward part of a landside, which is hinged at its rear end to a fixed standard, to adapt the plow-point to be raised and lowered; and, also, in the combination, with the slotted plow-beam and the movable forward standard, of two levers, their connecting-rods, and a rack-bar and its catch-plate, whereby the plow-point can be readily raised and lowered and will be securely held, as will be hereinafter fully described.

A are the forward wheels, to the axle B of which is attached the tongue C, at one side of the center of the said axle B, and directly in front of the plow-beam D. To the forward end of the plow-beam D is attached a clevis, E, which interlocks with a clevis, F. The clevis F passes through an opening in the axle B, so that the double-tree can be attached to the said clevis upon the forward side of the axle B. By this construction the draft will be applied directly to the plow-beam D.

G are the rear wheels, one of which revolves upon a journal of an axle-arm, H, attached to the rear end of the plow-beam D, so that the said wheel will run in the furrow opened by the plow. The other wheel G revolves upon the journal of an axle-arm, I, the upright arm of which moves up and down in a guide or keeper, J, attached to the end of the axle K. The other end of the axle K is attached to the rear part of the plow-beam D. To the inner side of the upright arm of the axle I is attached, or upon it is formed, a rack-bar, L, the teeth of which mesh into the teeth of a segment-lever, O, by means of which the land-side wheel can be raised and lowered to level the machine when one of the rear wheels is running upon the unplowed land and the other in a furrow.

To the lever O is pivoted the upwardly-projecting outer end of a bar, P, which has rack-teeth formed upon its lower edge, to engage with the upwardly-projecting edge of a catch-plate, Q, attached to the upper side of the axle K, so that the land-side wheel will be held securely in any position into which it may be adjusted.

R is the mold-board of the plow, which is connected with the forward end of the landside S in the ordinary manner. The rear end of the landside S is hinged to the lower end of a standard, T, the upper end of which is rigidly attached to or formed in one piece with the plow-beam D, so that the plow R S will be pushed forward through the soil by the said standard T. To the forward part of the landside S is attached the lower end of the standard U, which passes up through a long slot, D', in the plow-beam D.

To the upper end of the forward standard, U, are hinged the forward ends of the connecting-bars V, the rear ends of which are pivoted to the lever W at a short distance from its lower end. The lever W is hinged to the upwardly-projecting end of the standard T, or to a stud or other support attached to the plow-beam D, so that the plow R S can be adjusted to raise and lower the plow-point, and thus cause the plow to leave and enter the soil, by operating the lever W.

To the upper end of the forward standard, U, is hinged the rear end of the bar X, which projects forward along the upper side of the plow-beam D, and has rack-teeth formed upon its lower edge, to engage with the upwardly-projecting edge of the catch-plate Y, attached to the upper side of the plow-beam D, so that the plow will be held securely in any position into which it may be adjusted.

To the upper part of the rack-bar X, or to a short stud attached to the said rack-bar, is hinged the forward end of a connecting-bar, Z, which passes back through a slot in the lower part of lever W, and is hinged at its rear end to the lower end of the lever a. The lever a passes up along the rear side of the lever W, and is pivoted to a support, b, attached to the middle part of the said lever. The upper part of the lever a passes through a slotted guide, c, attached to the upper part of the lever W, and projects into such a position that it can be readily grasped and operated to raise the rack-bar X out of gear by the hand that grasps the lever W, to adjust the plow R S. With this construction, by bringing the upper end of lever a toward the lever W, the rack-bar X will be released from the catch-plate Y, and by the movement of the lever W the point of the plow may be raised and lowered to cause the plow to leave and enter the soil, and by releasing the lever a the rack-bar X will drop into gear with the catch-plate Y, to lock the plow in position.

d is the driver's seat, which is attached to the upper arm of a U-shaped spring-standard, e. The lower arm of the standard e is extended, passes through a keeper attached to the upper side of the axle K, or a slot formed in the said axle, and is secured in place adjustably by a set-screw or other suitable means. To the forward end of the lower arm of the spring-standard e is attached a board, f, to support the driver's feet.

To the side of the forward part of the plow-beam D is attached a keeper, g, in which is swiveled the upper end of a standard, h. The standard h is curved, as shown in Fig. 2, and has a circular colter, i, journaled to its lower end, as shown in Figs. 1 and 2, so that the said colter will adjust itself to the direction of the line of draft and travel in front of the landside S.

Having thus fully described my invention, I claim as new and desire to secure by Letters Patent—

In a wheel-plow, the combination, with the slotted plow-beam D and the movable forward standard, U, of the levers W a, the connecting-rods V Z, the rack-bar X, and its catch-plate Y, substantially as herein shown and described, whereby the plow-point can be readily raised and lowered and will be securely held, as set forth.

GEORGE W. HUNT.

Witnesses:
E. M. KESSINGER,
L. W. OLDS.